US009358836B2

(12) United States Patent
David et al.

(10) Patent No.: US 9,358,836 B2
(45) Date of Patent: Jun. 7, 2016

(54) AXLE AND VEHICLE COMPRISING AT LEAST ONE SUCH AXLE (71) Applicant: HAULOTTE GROUP, L'horme (FR)

(72) Inventors: Eric David, Barberaz (FR); Slaheddine Beji, Vienne (FR)

(73) Assignee: HAULOTTE GROUP, L'Horme (FR)

(*) Notice: Subject to any disclaimer, the term of this patent is extended or adjusted under 35 U.S.C. 154(b) by 14 days.

(21) Appl. No.: 14/414,898

(22) PCT Filed: Jul. 18, 2013

(86) PCT No.: PCT/EP2013/065204
§ 371 (c)(1),
(2) Date: Jan. 15, 2015

(87) PCT Pub. No.: WO2014/013023
PCT Pub. Date: Jan. 23, 2014

(65) Prior Publication Data
US 2015/0210115 A1 Jul. 30, 2015

(30) Foreign Application Priority Data
Jul. 19, 2012 (FR) ...................................... 12 56988

(51) Int. Cl.
*B60B 35/00* (2006.01)
*B60B 35/10* (2006.01)

(52) U.S. Cl.
CPC ............. *B60B 35/1054* (2013.01); *B60B 35/10* (2013.01); *B60B 2900/311* (2013.01); *B60B 2900/50* (2013.01); *B60Y 2200/43* (2013.01); *B60Y 2200/49* (2013.01)

(58) Field of Classification Search
CPC .... B60B 35/1054; B60B 35/10; B60B 35/00; B60B 35/1036; B60B 35/1072; B60B 35/109; B60B 35/16; B60Y 2200/49; B60Y 2200/43
See application file for complete search history.

(56) References Cited

U.S. PATENT DOCUMENTS 2,603,302 A * 7/1952 Anderson .......... B62D 49/0678
180/233
3,712,398 A * 1/1973 Althaus ................ B62D 55/084
180/9.48

(Continued)

FOREIGN PATENT DOCUMENTS

EP 1325861 A1 7/2003
WO 9731813 A1 9/1997

OTHER PUBLICATIONS

International Search Report, dated Aug. 20, 2013, from corresponding PCT application.

*Primary Examiner* — James M Dolak
(74) *Attorney, Agent, or Firm* — Young & Thompson (57) ABSTRACT An axle mounted on a vehicle chassis includes a central box section, a first support arm connected to a first wheel and slideably mounted inside the central box section, and a second support arm connected to a second wheel and capable of longitudinal translational movement inside the first support arm, a guiding box section fixed to the central box section, including a rectangular tube and defining an external annular volume included between the central box section and the tube, and an internal volume included inside the tube, the first support arm being housed inside the external annular volume and able to be guided by the guiding box section along a first longitudinal translational path, the second support arm being housed inside the internal volume and able to be guided by the guiding box section on a second longitudinal translational path. A vehicle equipped with such an axle is described.

10 Claims, 7 Drawing Sheets

(56) References Cited

U.S. PATENT DOCUMENTS

| | | | | |
|---|---|---|---|---|
| 4,431,074 A * | 2/1984 | Langerud | ............. | B62D 55/084 180/9.48 |
| 4,449,600 A * | 5/1984 | Telfer | ................. | B60B 35/1054 180/437 |
| 4,460,197 A * | 7/1984 | Rogers | .................... | B62D 7/00 280/779 |
| 5,489,114 A | 2/1996 | Ward et al. | | |
| 6,119,882 A | 9/2000 | Crook et al. | | |
| 6,206,125 B1 * | 3/2001 | Weddle | ................. | B60B 35/001 180/209 |
| 6,851,494 B2 * | 2/2005 | Harthauser | .......... | B62D 55/084 180/9.21 |
| 7,163,227 B1 * | 1/2007 | Burns | ................. | B60B 25/1054 180/906 |
| 7,997,432 B2 * | 8/2011 | Porubcansky | ........ | B66C 23/365 180/9.48 |
| 8,376,078 B2 * | 2/2013 | Hiddema | ............. | A01C 23/008 180/209 |
| 8,910,732 B1 * | 12/2014 | Risen | ...................... | B66C 23/62 180/9.48 |
| 9,156,312 B1 * | 10/2015 | Ruggeri | ................. | B60B 35/16 |

\* cited by examiner

AXLE AND VEHICLE COMPRISING AT LEAST ONE SUCH AXLE

FIELD OF THE INVENTION

The present invention relates to an extendable and retractable axle. The invention also relates to a vehicle comprising such an axle. The field of the invention is that of lifting vehicles and machines, in particular aerial lifts.

BACKGROUND OF THE INVENTION

Traditionally, an aerial lift comprises a motorized chassis, wheels, a turret pivoting at 360° on the chassis, a telescoping arm articulated on the turret, and a moving platform arranged at the end of the telescoping arm. Such a lift must be able to travel narrow passages easily and be transported without requiring heavy transport. The length and width of the lift must therefore be reduced, while keeping a high lifting performance.

The lift must also have significant stability, because there is a risk of tilting during its use, for example when the telescoping arm is inclined excessively. Such tilting must be avoided, in particular when an operator is on the moving platform located at height. In practice, the stability increases with the separation between the ground bearing points of the lift, i.e., the wheels equipping the chassis. Separating the wheels makes it possible to improve stability during use, but increases the bulk of the lift at the same time.

Thus, depending on the usage conditions, a compromise is sought between two critical and contradictory parameters.

In a known manner, an aerial lift may be equipped with extendable and retractable axles. For example, U.S. Pat. No. 6,119,882 describes a vehicle, of the aerial lift type, comprising two axles mounted on a chassis. Each axle includes two symmetrical support arms mounted across from each other in a central box. Each support arm is connected to a wheel of the vehicle and is moved by a hydraulic cylinder to allow its movement outside the central box. When the axles are retracted, in particular during movement of the lift, its widthwise bulk is reduced. When the axles are extended, in particular in the working position of the lift, its stability is improved. The extension travel of each support arm of such axles is nevertheless limited to a maximum of the half-width of the central box.

To resolve this drawback, one solution known from the prior art consists of mounting, within the central box, one of the support arms sliding inside the other support arm. This arrangement makes it possible to obtain telescoping support arms and thus to increase their extension travel. This increased extension travel of the support arms is, however, limited by the fact that both support arms must remain constantly bearing on each other, to respect the structural integrity constraints of the lift and the distribution of the forces exerted on the axle. This is not satisfactory, in particular in terms of limitation of the stability of the lift following limitation of the extension travel of the support arms.

SUMMARY OF THE INVENTION

The aim of the invention is to propose an axle having improved extension travel, in order to increase the stability of the lift, while giving the lift a reduced bulk.

To that end, the invention relates to an axle mounted on a chassis of a vehicle, the axle comprising a central box, a first support arm connected to a first wheel of the vehicle and slidingly mounted inside the central box, and a second support arm connected to a second wheel of the vehicle, the second support arm being longitudinally translatable inside the first support arm, wherein the axle also includes a guide box fastened to the central box, the guide box comprising a rectangular tube and defining an outer annular volume comprised between the central box and the tube, and an inner volume comprised inside the tube, the first support arm being received inside the outer annular volume and being able to be guided by the guide box along a first longitudinal translation path, the second support arm being received inside the inner volume and being able to be guided by the guide box along a second longitudinal translation path.

According to other advantageous aspects of the invention, the axle comprises one or more of the following features, considered alone or according to any technical possible combinations:

- the axle comprises at least one actuator, preferably a cylinder, forming a means for translating at least one of the first and second support arms, and the or each actuator extends along the longitudinal translation axis;
- the axle comprises a first cylinder and a second cylinder, respectively forming means for translating the first support arm and means for translating the second support arm, the first and second cylinders respectively being fastened to the first and second support arms each at least at a first respective fastening point;
- the first and second cylinders extend inside the inner volume of the guide box and at least one cylinder is fastened to the rectangular tube at least at one second fastening point;
- the first and second cylinders extend outside the central box and at least one cylinder is fastened to the central box at least at one second fastening point;
- the guide box has a length strictly smaller than the length of the central box;
- the second support arm comprises, on one of its outer walls, at least one support element withstanding pressure or forces exerted on the axle, the or each support element being able to be in contact with an inner wall of the guide box;
- the rectangular tube or the first support arm comprises, on one of the outer walls, at least one support element withstanding pressure or forces exerted on the axle, the or each support element being able to be in contact with an inner wall of the first support arm, or an inner wall of the central box;
- the central box, the guide box, the first support arm and the second support arm each have a substantially rectangular cross-section.

The invention also relates to a vehicle, in particular of the aerial lift type, equipped with a chassis, wherein the vehicle is also equipped with at least one axle as described above, the or each axle being mounted on the chassis of the vehicle.

Advantageously, the vehicle comprises at least two axles, said axles being mounted on the chassis of the vehicle and being mechanically independent.

Advantageously, the two support arms of a same axle according to the invention are movable outside the central box in a synchronized manner, which allows an operator to maneuver the vehicle in relatively narrow spaces.

Owing to the axles according to the invention, the vehicle is thus easily reconfigurable, while having high stability and a reduced bulk. Advantageously, the span of the telescoping arm of the vehicle is further improved.

BRIEF DESCRIPTION OF THE DRAWINGS

The features and advantages of the invention will appear upon reading the following description, provided solely as an example, and done in reference to the appended drawings, in which.

DETAILED DESCRIPTION

FIGS. 1 to 8 show a vehicle 1 of the aerial lift type according to the invention.

Figure 1:
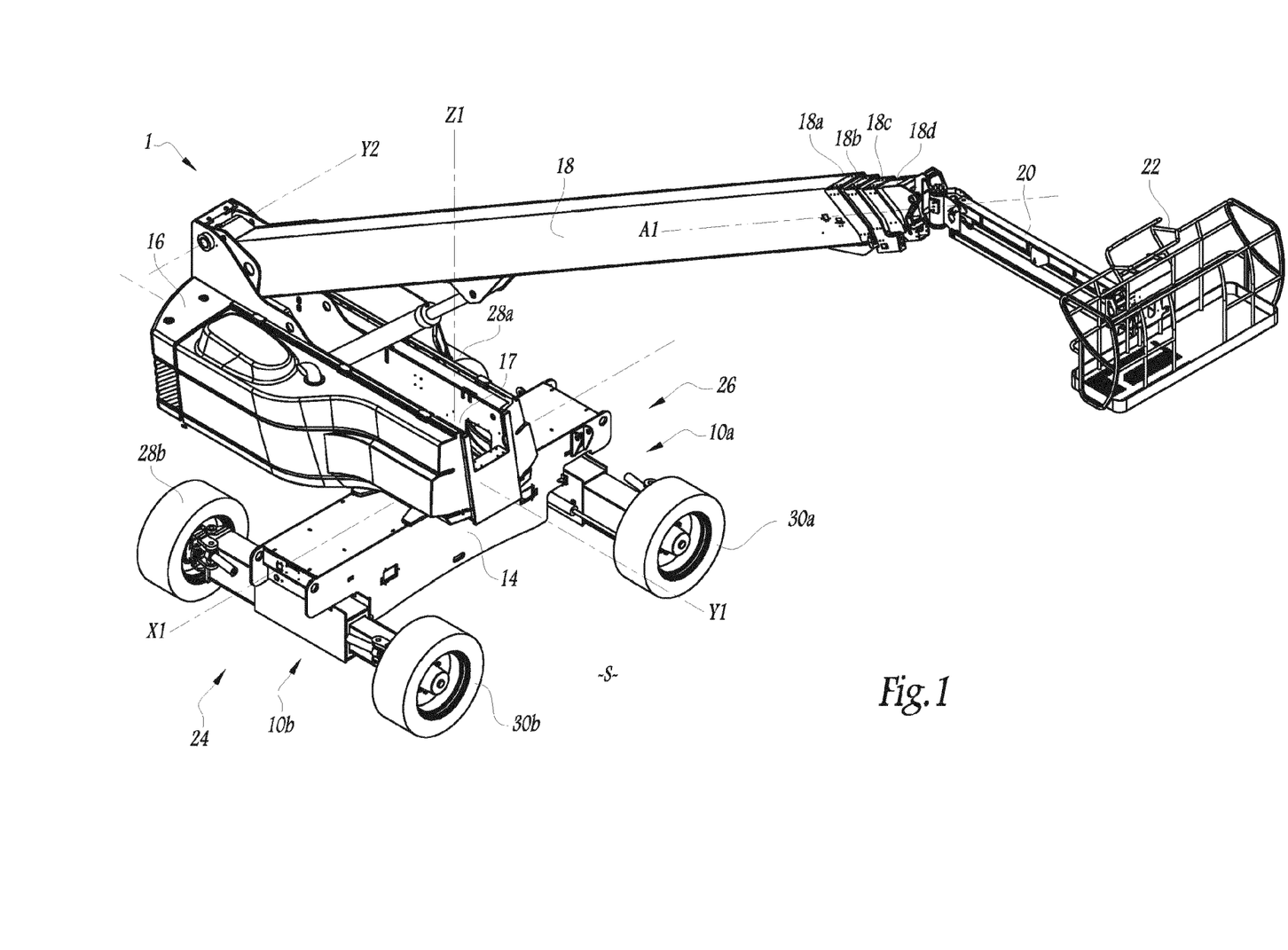
FIG. 1 is a perspective view of an aerial lift according to the invention, equipped with two axles also according to the invention.

The lift 1 is equipped with two axles 10a, 10b, also according to the invention, mounted on a motorized chassis 14. The chassis 14 has a globally parallelepiped shape. The motor means of the chassis 14, not shown, can comprise an internal combustion engine or an electric motor. An electronic central management unit, a hydraulic reservoir, a fuel tank and/or a set of electric batteries can also be mounted on the chassis 14.

In the rest of the description, the terms "horizontal", "vertical", "top" and "bottom" are defined relative to a surface area S. Reference X1 denotes the central longitudinal axis of the chassis 14 and Y1 denotes the central transverse axis of the chassis 14, perpendicular to the axis X1.

As illustrated in FIG. 1, a turret 16 able to rotate 360 degrees around a vertical axis of rotation Z1 is arranged on the chassis 14. Preferably, the turret 16 is actuated by hydraulic means, not shown. A telescoping arm 18 is articulated on the turret 16 around an axis Y2 perpendicular to the axis Z1. In the idle position, the arm 18 can be housed in a longitudinal housing 17 arranged in the turret 16. The arm 18 comprises several elongated boxes 18a, 18b, 18c and 18d, fitted in each other in a longitudinal direction with axis A1 perpendicular to axis Y2. The operation of the telescoping arm 18 is known in itself. Alternatively, the arm 18 can be a lifting arm, articulated or of any known type, or a vertical mast.

A support structure 20 of a platform 22 is arranged at the end 18d of the arm 18. The platform 22 is provided to receive a load, in particular people and equipment. The acceptable limit value depends on the dimensions and the mechanical strength of the various of elements of the lift 1. Moving on the ground S, when the turret 16 is oriented at 0 degrees, the operator of the lift 1, not shown, is positioned on the platform 22 and looks toward a front side 24 opposite a rear side 26 of the lift 1.

As shown in FIG. 1, the lift 1 comprises a rear axle 10a and a front axle 10b. The lift 1 is further provided with a left rear wheel 28a, a left front wheel 28b, a right rear wheel 30a and a right front wheel 30b. The rear axle 10a, the front axle 10b, respectively, is connected to the rear wheels 28a, 30a, the front wheels 28b, 30b, respectively. Each axle 10a, 10b is advantageously articulated on the chassis 14.

FIGS. 4 to 7 show the axles 10a in two configurations C1 and C2 of the lift 1, which will be outlined below.

Subsequently, for simplification purposes, the description is done primarily in reference to the rear axle 10a, with the understanding that the explanations are also valid for the front axle 10b.

Figure 2:
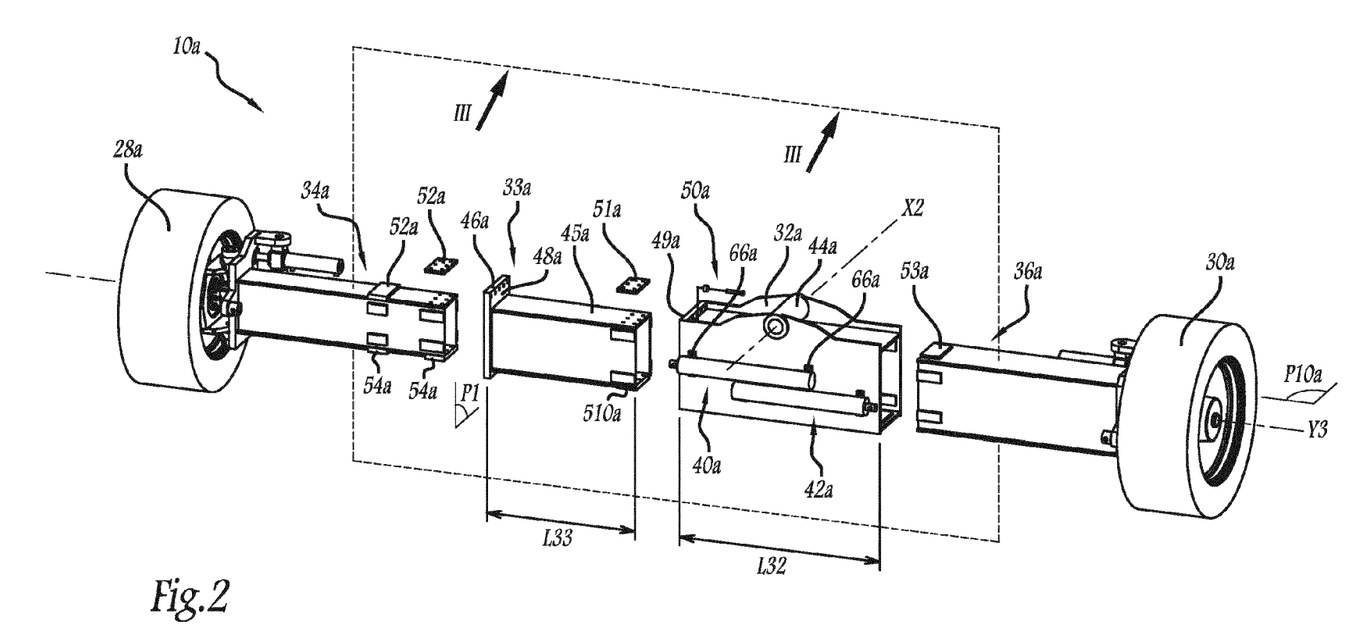
FIG. 2 is an exploded perspective view of an axle of the lift of FIG. 1 according to a first embodiment.

As illustrated in FIG. 2, the rear axle 10a extends between the rear wheels 28a, 30a along an axis Y3. The axis Y3 is the axis of rotation of the wheels 28a, 30a when the lift 1 moves forward in a straight line. The rear axle 10a includes a central box 32a, a guide box 33a, a left support arm 34a, a right support arm 36a, a left actuator 40a and a right actuator 42a. The central box 32a, the guide box 33a and the support arms 34a, 36a are, for example, formed by a mechanically welded metal structure.

In a known manner, the central box 32a is fastened to the chassis 14 via a mechanism 44a, configured as a pivot link with a longitudinal axis X2. In other words, the central box 32a is partially rotatable relative to the chassis 14 around a longitudinal axis X2, over several tens of degrees, for example over 10 degrees. This travel of the rear axle 10a of several tens of degrees allows the rear wheels 28a, 30a to follow different level differences in the terrain. Alternatively, the central box 32a is fastened to the chassis 14 via a rigid connection.

A reference plane P10a is defined that is associated with the rear axle 10a, that plane P10a being substantially parallel to the ground S when the lift 1 rests on the ground S. More specifically, the plane P10a is defined as the plane tangent to the upper planar surfaces of the central box 32a. The axis Y3 is parallel to the plane P10a and perpendicular to the longitudinal axis X2. Consequently, the axis Y3 is a substantially horizontal axis. For simplification purposes, it will hereinafter be considered that the axis Y3 is a horizontal axis.

The guide box 33a is fastened to the central box 32a and extends along the horizontal axis Y3, parallel to the plane P10a. The guide box 33a advantageously has a substantially rectangular cross-section and a length, measured parallel to the axes Y3, smaller than or equal to the length of the central box 32a. Preferably, as illustrated in the example embodiment of FIGS. 2 to 7, the guide box 33a has a length L33 strictly smaller than the length L32 of the central box 32a.

Figure 3:
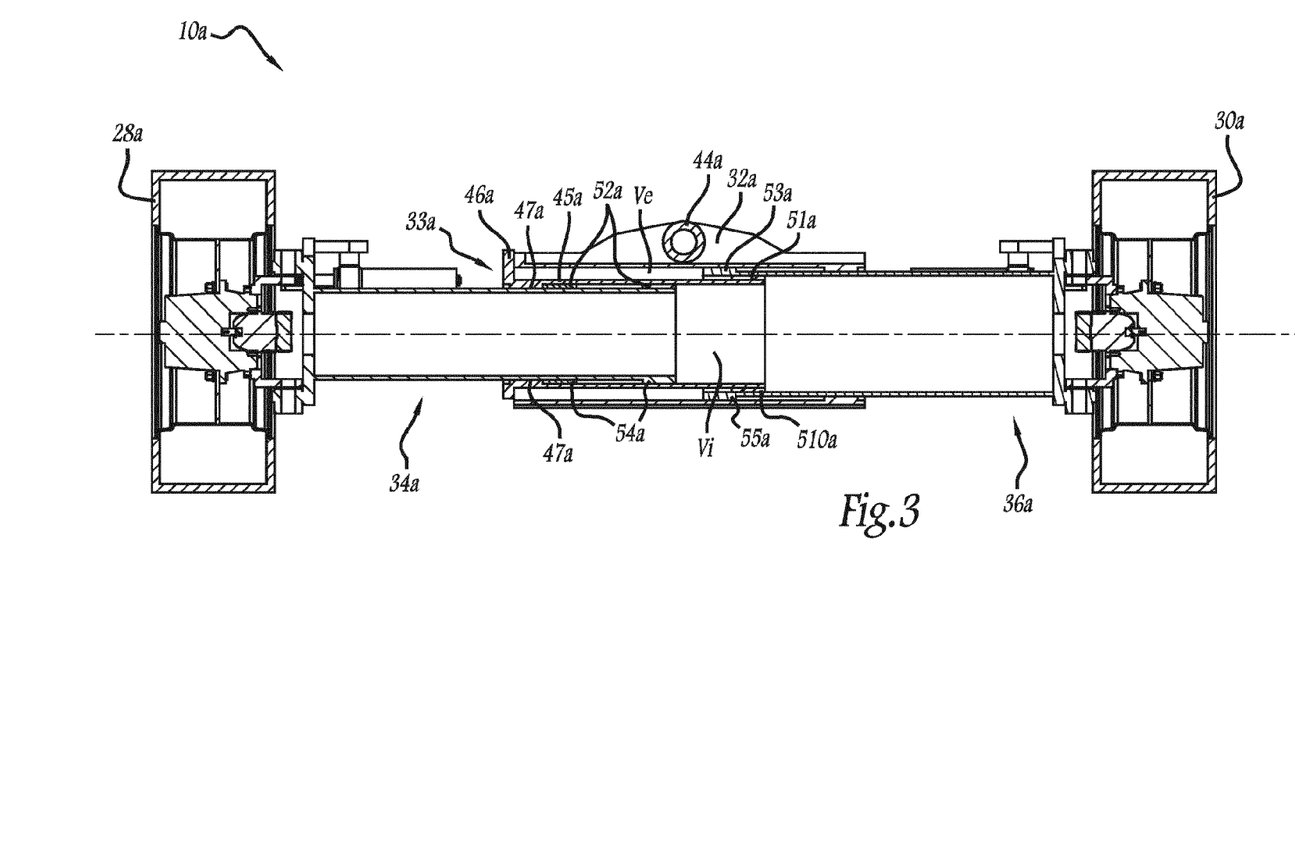
FIG. 3 is a view along plane III-III of FIG. 2, showing the axle as assembled.

The guide box 33a includes a rectangular tube 45a inserted into the central box 32a, as well as a collar 46a fastened to the tube 45a. The guide box 33a also includes two inner pads 47a, fastened on the end of the upper and lower inner walls, respectively, of the tube 45a, on the side of the collar 46a, as illustrated in FIG. 3. The collar 46a extends over the left end of the tube 45a and has an outer contour that is for example substantially rectangular. The collar 46a extends substantially over the entire perimeter of the tube 45a, in a vertical plane P1 perpendicular to the plane P10a. The collar 46a defines a right bearing surface 48a able to cooperate with the left lateral wall 49a of the central box 32a, to lock the longitudinal translation of the guide box 33a, from left to right along the axis Y3. The central box 32a is fastened to the collar 46a by suitable fastening means, for example a screw and bolt fastening system 50a.

The rectangular tube 45a includes, on the right end of its upper, lower outer wall, respectively, at least one first support element 51a, at least one second support element 510a, respectively, for withstanding pressure or forces exerted on the rear axle 10a. In the example embodiment of FIGS. 2 to 7, the tube 45a includes a first support element 51a and a second support element 510a.

As illustrated in FIG. 3, the guide box 33a defines an outer annular volume Ve comprised between the central box 32a and the tube 45a, and an inner volume Vi comprised inside the tube 45a. The guide box 33a thus defines an outer longitudinal translation path comprised in the outer annular volume Ve, and an inner longitudinal translation path comprised in the inner volume Vi.

The left support arm 34a, right support arm 36a, respectively, extends along the horizontal axis Y3 and is connected to the left rear wheel 28a, right rear wheel 30a, respectively. The left support arm 34a is translatable inside the right support arm 36a and the central box 32a, along the horizontal axis Y3. The right support arm 36a is slidingly mounted inside the central box 32a, along the horizontal axis Y3. More specifically, the left support arm 34a is received inside the inner volume Vi and is slidingly mounted inside the guide box 33a, along the axis Y3. The right support arm 36a is received inside the outer annular volume Ve and is mounted slidingly between the rectangular tube 45a and the central box 32a, along the horizontal axis Y3. The left support arm 34a is thus able to be guided by the guide box 33 along the inner longitudinal translation path, along the axis Y3. The right support arm 36a is thus able to be guided by the guide box 33 along the outer longitudinal translation path, along the axis Y3.

On the right end of its upper outer wall, the left support arm 34a includes at least one third support element 52a, able to be in contact with the upper inner wall of the guide box 33a. On the left end of its upper outer wall, the right support arm 36a includes at least one fourth support element 53a, able to be in contact with the upper inner wall of the guide box 32a.

Furthermore, on the right end of its lower outer wall, the left support arm 34a includes at least one fifth support element 54a, able to be in contact with the lower inner wall of the guide box 33a. On the left end of its lower outer wall, the right support arm 36a includes at least one sixth support element 55a, able to be in contact with the lower inner wall of the guide box 32a.

In the example embodiment of FIGS. 2 to 7, the left support arm 34a includes two third support elements 52a spaced horizontally along the horizontal axis Y3. The left support arm 34a also includes two fifth support elements 54a spaced horizontally along the axis Y3. The right support arm 36a includes a fourth support element 53a and a sixth support element 55a. The presence of two third support elements 52a on the left support arm 34a allows continuous assurance of the presence of at least one support element 52a inside the inner volume Vi of the guide box 33a.

Advantageously, each support element 51a, 510a, 52a, 53a, 54a, 55a is a substantially rectangular pad. Advantageously, each first, third and fourth support element 51a, 52a, 53a is made from a plastic material, for example polyamide. The third and fifth support elements 52a, 54a are further able to facilitate the sliding of the left support arm 34a inside the guide box 33a. The fourth and sixth support elements 53a, 55a are further able to facilitate the sliding of the right support arm 36a inside the central box 32a. Furthermore, the first support element 51a, the second support element 510a, respectively, can be in contact with the inner upper wall, the lower inner wall, respectively, of the right support arm 36a.

Figure 4:
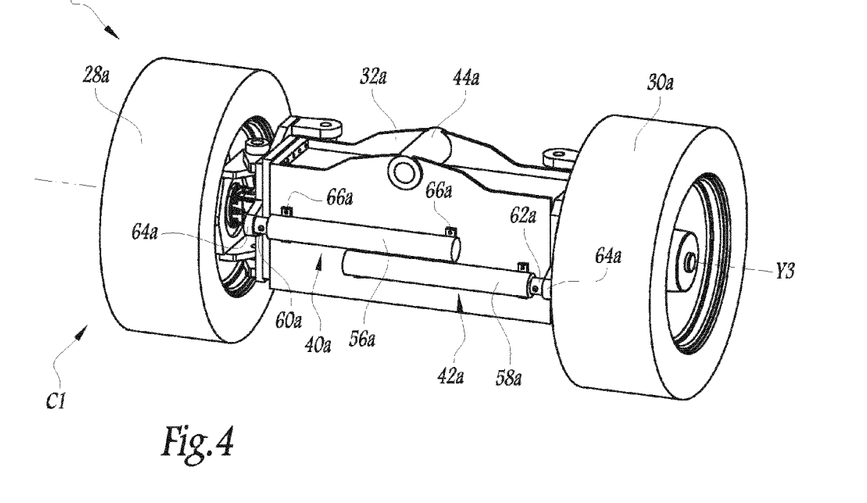
FIG. 4 is a perspective view of the axle of FIGS. 2 and 3, in a compact configuration of the lift.
Figure 5:
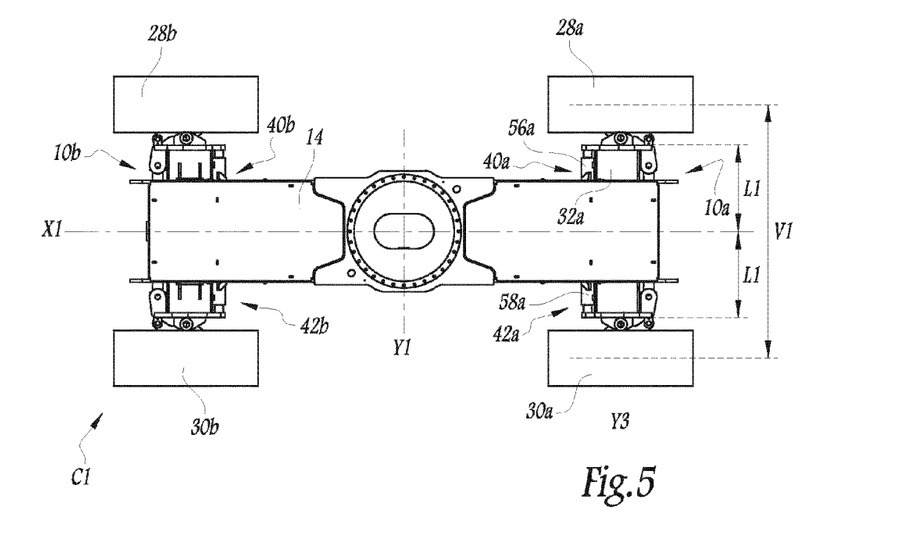
FIG. 5 is a top view of the lift of FIG. 1, showing the lift in a compact configuration, the turret and the arm being omitted for clarity of the drawing.
Figure 6:
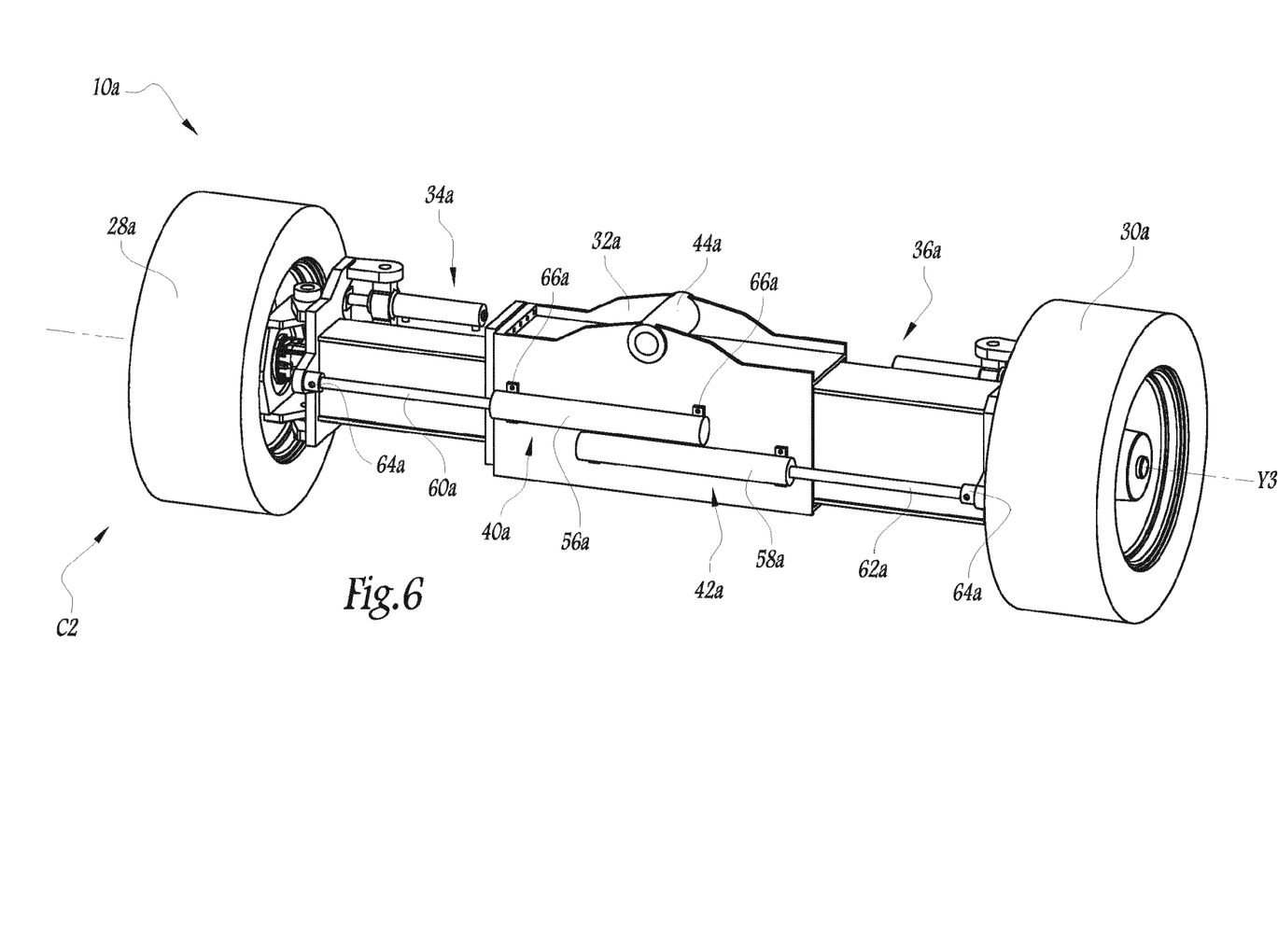
FIGS. 6 and 7 are views similar to FIGS. 4 and 5, respectively, in an extended configuration of the lift.

Each actuator 40a, 42a extends outside the central box 32a. This favored embodiment of the actuators 40a, 42a makes it possible to facilitate their maintenance, as well as the guiding of the different cables and hoses supplying the actuators. These supply cables and hoses are not shown, for simplification reasons. At least one actuator 40a, 42a is fastened on an outer lateral wall of the central box 32a at least at one fastening point 66a. The left actuator 40a, right actuator 42a, respectively, is configured as a cylinder extending along the horizontal axis Y3 and comprising a left cylinder body 56a, a right cylinder body 58a, respectively, and a left cylinder rod 60a, a right cylinder rod 62a, respectively. The left cylinder rod 60a, the right cylinder rod 62a, respectively, is secured to the left support arm 34a, the right support arm 36a, respectively, at least at one fastening point 64a. In the example embodiment of FIGS. 2 to 7, each cylinder body 56a, 58a is fastened on an outer wall of the central box 32a at two fastening points 66a. The left cylinder rod 60a, the right cylinder rod 62a, respectively, is fastened on an outer wall of the left support arm 34a, the right support arm 36a, respectively, at a single fastening point 64a, as illustrated in FIGS. 4 and 6.

Figure 7:
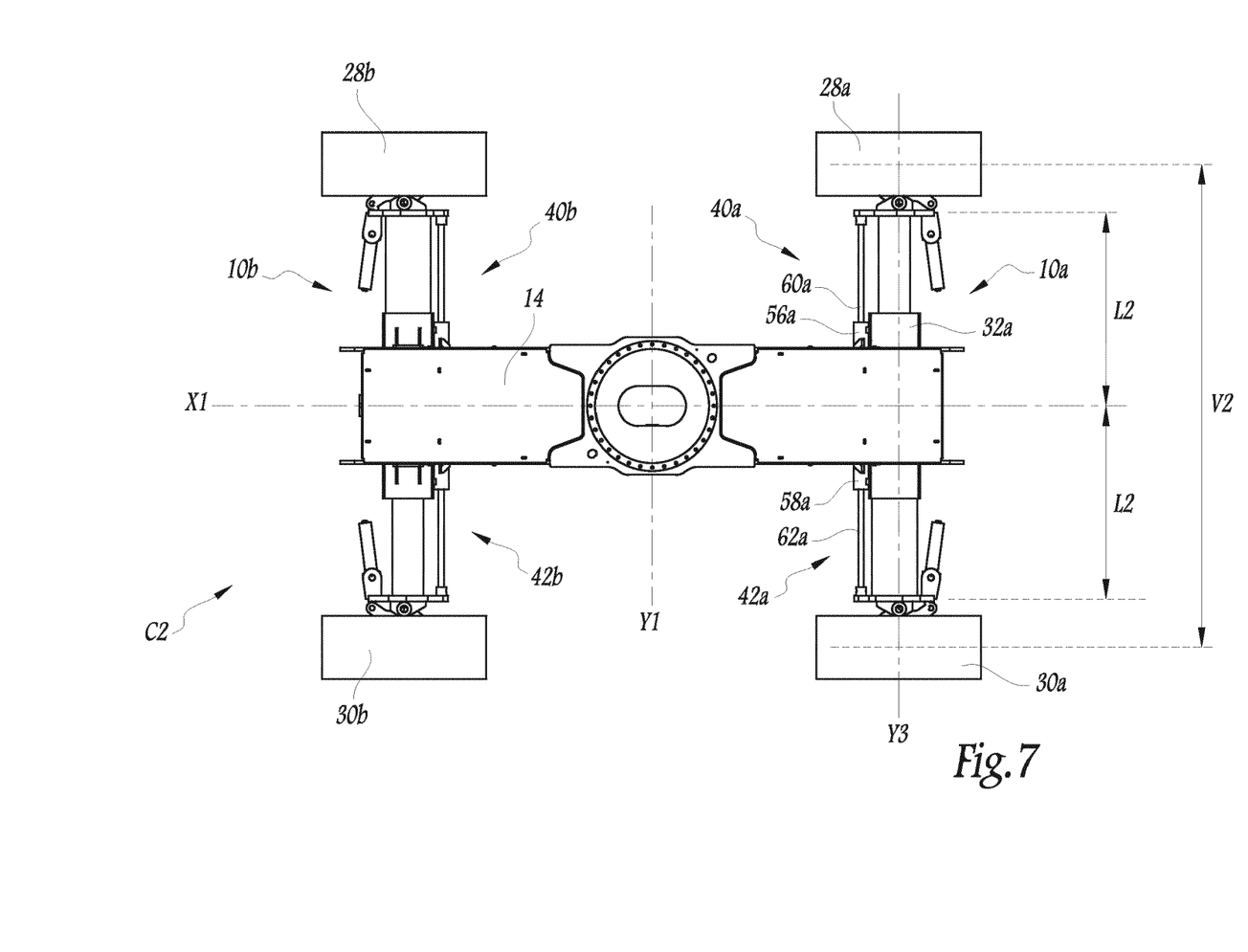

Advantageously, each actuator 40a, 42a is a cylinder, in particular a hydraulic, electric or pneumatic cylinder. In other words, the left actuator 40a, right actuator 42a, respectively, constitutes a longitudinal translation means for the left support arm 34a, the right support arm 36a, relative to the central box 32a and the guide box 33a. As shown in FIGS. 5 and 7, the left actuator 40a, right actuator 42a, respectively, is extendable between a length L1 and a length L2, measured parallel to the axis Y3 between a vertical plane comprising the longitudinal axis X1 and a vertical plane tangent to the left end of the left support arm 34a, to the right end of the right support arm 36a, respectively.

Each actuator 40a, 42a, respectively, can also be coupled to a linear position sensor of the rod 60a, 62a, respectively, relative to the body 56a, 58a, respectively, and/or an end-of-translation contactor. These elements associated with the actuators 40a, 42a are not shown for simplification purposes.

Traditionally, an axle may be a load carrying, steering and/or powered axle.

In the case at hand, the rear axle 10a is configured to carry the component elements 14 to 22 of the lift 1. In the event the rear axle 10a incorporates means for transmitting a rotational movement to the rear wheels 28a, 30a around their axes of rotation Y3, the axle is also a powered axle. These transmission means can receive a drive torque coming from the motor means of the chassis 14.

The component elements of the front axle 10b are similar to the component elements of the rear axle 10a and bear the same numerical references, replacing the reference "a" with the reference "b".

The spacing between the rear wheels 28a and 30a on the one hand and the front wheels 28b and 30b on the other hand, considered in the direction of the length of the lift 1, is called "wheelbase". The spacing between the rear wheels 28a and 30a, or between the front wheels 28b and 30b, considered in the direction of the width of the lift 1, is called "track width". The width of the lift 1 being smaller than its length, the track width is consequently smaller than the wheelbase. In the two configurations C1 and C2 of the lift 1 described hereinafter, the wheelbase of the lift is constant.

FIGS. 4 and 5 show the lift 1 in a compact configuration C1, imparting a minimal bulk. The lift 1 then has a minimal track width V1 and the actuators 40a, 40b, 42a, 42b are retracted. The track width V1 is substantially equal to 2.5 m. In its compact configurations C1, the lift 1 can thread its way into a narrow passage, or enter or leave a container or trailer during loading or unloading.

FIGS. 6 and 7 show the lift 1 in an extended configuration C2, imparting maximum substantially. The lift 1 then has a maximum track width V2 and the actuators 40a, 40b, 42a, 42b are extended outward, opposite the axis Z1. The track width V2 is for example comprised between 3.5 m and 4 m, for example substantially equal to 3.8 m. In its extended configuration C2, the lift 1 has maximal stability. During a 360° rotation of the turret 16, the stability of the lift 1 varies based on the position of that turret 16 and the other moving elements: lifting arm 18, structure 20, platform 22 and its occupants. In the extended configuration C2, the stability of the lift 1 varies little during operation, regardless of the rotational position of the turret 16 and the other elements 18, 20 and 22. In this configuration C2, the lift 1 can move by rolling on wheels 28a, 28b, 30a, 30b, even if the cantilever between the chassis 14 and the wheels is considerable.

The horizontal deployment of the axles 10a, 10b will now be described. The lift 1 can deploy based on usage constraints and the operator's discretion. Before choosing to deploy the lift 1, the operator visually identifies the deployment limits of the lift 1, in particular obstacles on the ground S. The central processing unit, which can be configured to transfer information received from proximity sensors distributed on the perimeter of the lift 1, can assist the operator in the decision-making process.

The deployment can be activated during deployment of the lift 1, above a certain speed and when there is sufficient space. In that case, the lift 1 moves forward or backward, or alternatively from front to back, while each axle is gradually moved from the retracted position to the extended position, or vice versa.

Figure 8:
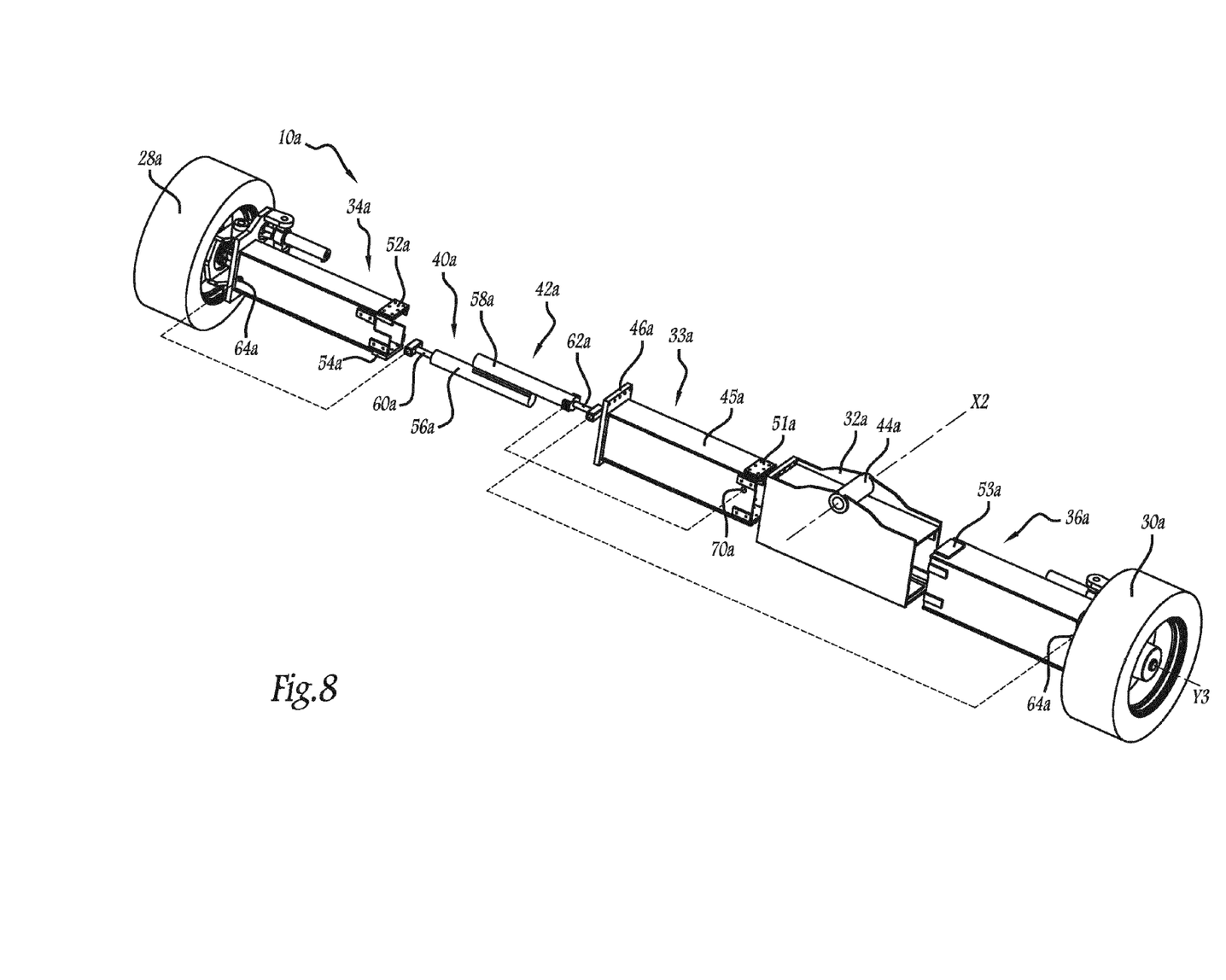
FIG. 8 is a view similar to FIG. 2 for an axle according to a second embodiment.

FIG. 8 illustrates a second embodiment, for which the elements similar to the first embodiment previously described are identified using identical references.

According to this second embodiment described in reference to a rear axle 10a, each actuator 40a, 42a extends inside the inner volume Vi of the guide box 33a. At least one actuator 40a, 42a is fastened via its cylinder body 56a, 58a on an inner wall of the tube 45a, at least at one fastening point 70a. In the example embodiment of FIG. 8, the cylinder bodies 56a, 58a of the actuators 40a, 42a are secured and the right cylinder body 58a is fastened on the right end of an inner lateral wall of the tube 45a, at a single fastening point 70a. Unlike the first embodiment, the left cylinder rod 60a, the right cylinder rod 62a, respectively, is further fastened on an inner wall of the left support arm 34a, the right support arm 36a, respectively, at a single fastening point 64a.

Furthermore, according to this second embodiment, the left support arm 34a only has one second support element 52a.

In an alternative that is not shown, the cylinder bodies 56a, 58 are not secured and each cylinder body 56a, 58 is fastened on an inner wall of the tube 45a, at least at one fastening point 70a.

Although the description of this second embodiment of the invention has been provided in reference to the rear axle 10a, it applies in the same manner to the front axle 10b, replacing "a" with "b" in the numerical references.

The operation of the axle according to this second embodiment is similar to that of the first embodiment previously described, and is therefore not described again.

Compared to the axle according to the first embodiment, the axle according to the second embodiment makes it possible to protect the actuators 40a, 42a against any impacts.

Owing to the presence of a guide box acting as an intermediate mechanical support for the support arms, the axles 10a, 10b according to the invention thus make it possible to increase the track width of the lift 1. Subsequently, the stability of the lift 1 and the maximum admissible span of the platform 22 are also increased.

Preferably, the electronic central management unit mounted on the chassis 14 makes it possible to compute the maximum admissible span of the platform 22 based on different parameters, such as: the rotation of the turret 16, the extension of the telescoping arm 18, the load of the platform 22, the track width V between the wheels and/or the incline of the terrain. Any suitable parameter may be or not be taken into account selectively. In a simplified manner, the maximum admissible span computation may not depend on the rotation of the turret 16, but integrate the least favorable case: when the turret 16 and the arm 18 are oriented at 90 degrees from the axis X1 of the chassis 14, as shown in FIG. 1.

Furthermore, due to their actuation by independent actuators 40a, 42a; 40b, 42b, respectively, the left and right support arms 34a, 36; 34b, 36b, respectively, may be extended or retracted in a synchronized or non-synchronized manner. This gives the operator the ability to maneuver and reconfigure the vehicle in relatively narrow spaces.

Furthermore, the axles 10a, 10b being mechanically independent, the actuators 40a and 42a on the one hand, and 40b and 42b on the other hand, can be commanded, independently or in a synchronized manner, by the electronic central management unit mounted on the chassis 14 and controlled by the operator of the lift 1. By using the central management unit to control the actuators independently, the operator can increase the stability of the front or rear part of the lift 1 independently, as needed.

Preferably, the axles 10a, 10b have the same construction, such that the lift 1 is easier and less expensive to manufacture. Furthermore, the symmetrical elements between the axles 10a, 10b facilitate the management of the various movements by the central unit.

Also preferably, the rear axle 10a, front axle 10b, respectively, incorporates means for transmitting a rotational movement to the rear wheels 28a, 30a, the front wheels 28b, 30b, respectively. These transmission means, not shown for simplification purposes, are configured to receive a driving torque from the motor means of the chassis 14. In that case, each axle 10a, 10b is a powered axle.

According to one particular alternative that is not shown, the lift may comprise a combination of load carrying and/or powered and/or steering axles 10a, 10b. For example, the rear axle 10a may be a load carrying and powered axle, while the front axle 10b may be a load carrying and steering axle, or vice versa.

According to one particular alternative that is not shown, the lift includes more than two axles, which may be of identical or different types. For example, a lift equipped with three axles may comprise a steering axle, a powered axle and a load carrying axle. According to another example, each of the axles is a load carrying, steering and powered axle.

According to another embodiment, not shown, the left and right actuators are replaced by a single telescoping actuator in at least one axle of the lift. The telescoping actuator is for example formed by a telescoping cylinder secured at each of its ends to the left and right support arms. This telescoping actuator for example extends inside the inner volume Vi of the guide box, along the horizontal axis Y3. Alternatively, the telescoping actuator extends outside the central box, along the horizontal axis Y3. This telescoping actuator constitutes a longitudinal translation means of the left and right support arms relative to the central box.

Although the description has been done in reference to specific configurations of the lift 1, corresponding to the minimum bulk and maximum stability thereof, one skilled in the art will understand that other intermediate configurations are possible. In particular, one interesting intermediate configuration is obtained when one of the two axles is extended and the other axle is retracted.

The invention has been shown in the case where it is used on a vehicle of the aerial lift type. The invention is applicable to all public works, handling or lifting vehicles, such as power shovels, power lift trucks, order preparers or cranes.

The invention claimed is:

1. An axle mounted on a chassis of a vehicle, the axle comprising a central box, a first support arm connected to a first wheel of the vehicle and slidingly mounted inside the central box, and a second support arm connected to a second wheel of the vehicle, the second support arm being longitudinally translatable inside the first support arm, wherein the axle also includes a guide box fastened to the central box, the guide box comprising a rectangular tube and defining an outer annular volume between the central box and the tube, and an inner volume inside the tube, the first support arm being received inside the outer annular volume and being able to be guided by the guide box along a first longitudinal translation path, the second support arm being received inside the inner volume and being able to be guided by the guide box along a second longitudinal translation path.

2. The axle according to claim 1, comprising at least one actuator, forming a means for translating at least one of the first and second support arms, and said at least one actuator extends along the longitudinal translation axis.

3. The axle according to claim 2, comprising a first cylinder and a second cylinder, respectively forming means for translating the first support arm and means for translating the second support arm, the first and second cylinders respectively being fastened to the first and second support arms each at least at a first respective fastening point.

4. The axle according to claim 3, wherein the first and second cylinders extend inside the inner volume of the guide box and in that at least one cylinder is fastened to the rectangular tube at least at one second fastening point.

5. The axle according to claim 3, wherein the first and second cylinders extend outside the central box and in that at least one cylinder is fastened to the central box at least at one second fastening point.

6. The axle according to claim 1, wherein the guide box has a length strictly smaller than the length of the central box.

7. The axle according to claim 1, wherein the second support arm comprises, on one of its outer walls, at least one support element withstanding pressure or forces exerted on the axle, said at least one support element being able to be in contact with an inner wall of the guide box.

8. The axle according to claim 1, wherein the rectangular tube or the first support arm comprises, on one of the outer walls, at least one support element withstanding pressure or forces exerted on the axle, said at least one support element being able to be in contact with an inner wall of the first support arm, or an inner wall of the central box.

9. The axle according to claim 1, wherein the central box, the guide box, the first support arm and the second support arm each have a substantially rectangular cross-section.

10. A vehicle, equipped with a chassis, wherein the vehicle is also equipped with at least one axle according to claim 1, said at least one axle being mounted on the chassis of the vehicle.

* * * * *